(12) United States Patent
Weimer et al.

(10) Patent No.: US 7,827,820 B2
(45) Date of Patent: Nov. 9, 2010

(54) THERMODYNAMIC MACHINE AND METHOD FOR ABSORBING HEAT

(75) Inventors: Thomas Weimer, Sindelfingen (DE); Michael Hackner, Marbach (DE); Hans Hasse, Kaiserslautern (DE); Norbert Stroh, Magstadt (DE); Eckehart Walitza, Aalen (DE)

(73) Assignee: Makatec GmbH, Bondorf. (DE)

( * ) Notice: Subject to any disclaimer, the term of this patent is extended or adjusted under 35 U.S.C. 154(b) by 891 days.

(21) Appl. No.: 10/557,423

(22) PCT Filed: May 21, 2004

(86) PCT No.: PCT/EP2004/005504

§ 371 (c)(1),
(2), (4) Date: Mar. 1, 2006

(87) PCT Pub. No.: WO2004/104496

PCT Pub. Date: Dec. 2, 2004

(65) Prior Publication Data

US 2006/0150665 A1    Jul. 13, 2006

(30) Foreign Application Priority Data

May 21, 2003   (DE) ............................... 103 24 300

(51) Int. Cl.
*F25B 15/00*    (2006.01)
(52) U.S. Cl. ...................................... 62/476

(58) Field of Classification Search ................... 62/476, 62/494, 497
See application file for complete search history.

(56) References Cited

U.S. PATENT DOCUMENTS

| 1,882,258 | A |   | 10/1932 | Randel |
| 3,520,803 | A | * | 7/1970  | Iaconelli ..................... 210/640 |
| 3,645,111 | A |   | 2/1972  | Williamitis .................. 62/498 |
| 3,695,444 | A | * | 10/1972 | Iaconelli ................. 210/321.75 |
| 4,602,987 | A | * | 7/1986  | Bonaventura et al. ....... 205/633 |
| 4,617,182 | A | * | 10/1986 | Brown et al. ................. 423/579 |
| 4,650,574 | A |   | 3/1987  | Hilgendorff et al. ........ 210/180 |
| 6,103,118 | A |   | 8/2000  | Ter Meulen ............ 210/321.79 |
| 6,539,728 | B2 | * | 4/2003 | Korin ............................. 62/80 |

FOREIGN PATENT DOCUMENTS

| GB | 438667   | 11/1935 |
| WO | 99/16542 | 4/1999  |
| WO | 99/64147 | 12/1999 |

\* cited by examiner

*Primary Examiner*—Melvin Jones
(74) *Attorney, Agent, or Firm*—Gudrun E. Huckett

(57) ABSTRACT

A thermodynamic machine for the absorption and emission of heat at different temperatures has at least one thermodynamic device with at least one membrane separating a gas phase and a liquid phase provided for transport of heat, wherein the at least one membrane is permeable for at least one component contained in the gas and liquid phases. The at least one membrane is a porous membrane or a solution diffusion membrane or a modification of the porous membrane or a modification of the solution diffusion membrane.

15 Claims, 4 Drawing Sheets

THERMODYNAMIC MACHINE AND METHOD FOR ABSORBING HEAT

BACKGROUND OF THE INVENTION

1. Field of the Invention

The present invention relates to a thermodynamic apparatus and a method for the absorption and emission of heat, wherein at least one temperature during heat emission is located above at least one temperature during heat absorption.

2. Prior Art

One conventional technology for the production of cooling energy in air-conditioning and for cooling purposes are mechanically driven compression cooling devices. As an alternative, also absorption refrigeration devices with conventional tube bundle or plate absorbers are used. Recently, also adsorption cooling devices are developed based on zeolites, with a similar working process like absorption refrigeration devices.

Refrigeration devices have the task to absorb heat at low temperatures and to emit heat at high temperatures again. The profit is the absorption of heat at low temperature. The same process is performed by heating pumps; however, here the profit comes from the heat emission at high temperature. There are further modifications like heat transformers, where the heat is absorbed at medium temperature and emitted at high (useful heat) and at very low (waste heat) temperature.

The process of the aforemntioned kind will be described here for a refrigeration device as an example. It can be applied accordingly to the other mentioned processes heat pump and heat transformer.

Adsorption, absorption and compression cooling devices need an evaporator, which absorbs the heat from the object to be cooled during an evaporation at low temperature and low pressure and a condenser in which the cooling agent condensates after being compressed to higher pressure at environmental temperature level under heat emission to the environment. While in a compression cooling device the gas compressor compresses the cooling agent vapor to the pressure required for condensation, in an absorption or adsorption refrigeration device this function is performed by a so called "thermal compressor". This is a solvent cycle with cooled adsorber or absorber and heated desorber. The absorber in which the cooling agent vapor is absorbed at low pressure from the solvent operates on a similar temperature level as the condenser. In the desorber, the cooling agent will be emitted again by heat addition from the solvent at high temperature under high pressure. In case of a volatile solvent, a rectification is needed for the desorber, in order to obtain pure cooling agent vapor.

Absorption refrigeration devices, as well as compression cooling devices, are sensible to mechanical shocks. In addition adsorption and absorption refrigeration devices require higher investment costs and show up a bigger construction volume and a higher weight than compression cooling devices.

When in an absorption refrigerator a volatile solvent such as water is used, the required rectification increases the investment costs and the construction volume further. Most of the investment costs of an absorption refrigerator are attributed to the heat transmitters. The absorber—with a part of about 40%—contributes the most to the total installed heating transmitter surface.

Because of their lack of mechanical robustness nowadays absorption refrigeration devices cannot be used in mobile sectors. This lack of mechanical robustness is related to the fact that in devices with liquid films, the liquid wetting of the heat exchanger surface are negatively affected by mechanical shocks, because the liquid gets through the devices as a free falling film.

In adsorption refrigeration devices, the main problem is the low heat transfer in the adsorber and desorber, as in these devices, no liquid is included and therefore, only the mechanisms of the heat conduction in fixed beds and the gas flow are relevant for the heat transport This causes increased investment costs compared to an absorption refrigerator.

Too high investment costs and too big construction volume are main obstacles which obstruct a further spreading of the absorption refrigeration technology and lead to the fact, that even in case that cheap energy is available—like waste heat—compression cooling devices are often preferred with the main disadvantage of consuming high quality mechanical energy.

From the German patent specification 633 146, an absorption device—especially a continuously working absorption refrigerator—is known, in which the solution coming from a boiler/evaporator gets into an storage tank, then flowing into a liquid filled absorber equipped with a diaphragm Here gas is absorbed through its diaphragmatic wall. With this construction the danger of a change in flow direction of the liquid can be eliminated without requiring a pump. This device described in DE-PS 633 146 is a precursor of today's membrane/diaphragm-less absorption diffusion refrigerator.

DE 195 11 709 A1 reveals a sorption refrigerator in which the solvent that is at the same time the cooling medium is flowing in a circuit in a mixture with a sorption medium and is transferred by pervaporation from a highly concentrated to a low-concentration solution. In order to enable a transport contrarily to the concentration gradient, a temperature difference must be guaranteed in the device by simultaneous heating of the concentrated solution and cooling of the lean solution (reverse osmosis principle). Here, both solutions are separated inside the device by means of a semipermeable membrane. In addition conventional Desorber and absorber are used.

Based on this the invention has the object to eliminate the disadvantages of conventional processes by providing a refrigeration device/method or heat pump process which is cheap, compact and mechanical shock resistant.

SUMMARY OF THE INVENTION

As a solution to this object, the invention suggests a thereto-dynamic apparatus in which at least two phases for the transport of heat are separated by at least one membrane as well as a corresponding method.

The present invention concerns a thermodynamic machine and a method for the absorption and the emission of heat, where at least one temperature for heat emission is higher than at least one temperature of the heat absorption.

The heat absorption and emission is effected by using at least one thermodynamic device having at least one membrane for the separation of two phases. A transport of the cooling agent through the membrane occurs. In a further, preferred development of the invention, it is provided, that inside the at least one thermodynamic device, at least one phase is heated or cooled using a heat exchanger.

Further advantageous developments of the inventions result from the dependent claims.

With the present invention, based on the design of the thermodynamic machine, a mechanical robust process for refrigeration and for related tasks is provided. The mentioned process can be used for example for refrigerators and heat pumps, as well as similar installations. A process/method with the characteristics of the invented thermodynamic machine has the advantage that—by virtue of its mechanical robustness—it can be used for mobile as well as for stationary applications.

In the at least one thermodynamic device, refrigerator or heat supplying device being a main part of the thermodynamic machine, two fluid phases are separated by membranes/membrane components. In absorption refrigerators/heat pumps as well the absorber and the desorber may be configured as membrane devices. The membrane device is mechanical shocks resistant. In the membrane absorber and/or the membrane desorber a forced convection rules, so that—compared to conventional absorption devices with free fluid falling films—a significantly increased heat transport is given. Compared to a conventional absorber/desorber, the construction volume is reduced. Moreover, beside the increased transport characteristic, this is also related to the very high specific interphase area of up to 10000 m2/m3, which can be achieved by modern membranes. A simultaneous cooling or heating in the membrane components causes further advantages. A very interesting alternative is the realisation of a heat exchange between solvent and cooling medium in the membrane absorber In principle all known membrane types can be used, such as diffusion or pore-membranes. In a membrane desorber, a selective mass transfer can be achieved by choosing proper membrane materials, so that also for volatile solvents such as water no rectification is required.

Likewise, the membrane components can also be used for the evaporator or condenser in the absorption and compression devices. In compression devices, as an example, the reliability of the compressor can be increased, in case that exceptional mechanical shocks are expected to turn up.

By using plastics for the membranes and the device housing, a very low cost production is possible. If high thermal stress is expected—for example for a desorber—ceramic pore-membranes can be used.

Further advantages and configurations of the invention can be derived from the description and the enclosed drawing.

It is understood that the above mentioned characteristics, as well as the following tones still to be explained, may not only be used in the indicated combination, but also in other combinations or isolated, without leaving the gist of the present invention.

The invention is shown schematically by means of an embodiment in the enclosed drawings and will be described in detail as follows with reference to the drawings.

DETAILED DESCRIPTION

In FIGS. 1 to 5, various alternatives of the present invention are illustrated. The process compliant with the invention can be used in any case where phase transition occurs with heat exchange on different temperature levels and with the environment.

Figure 1:
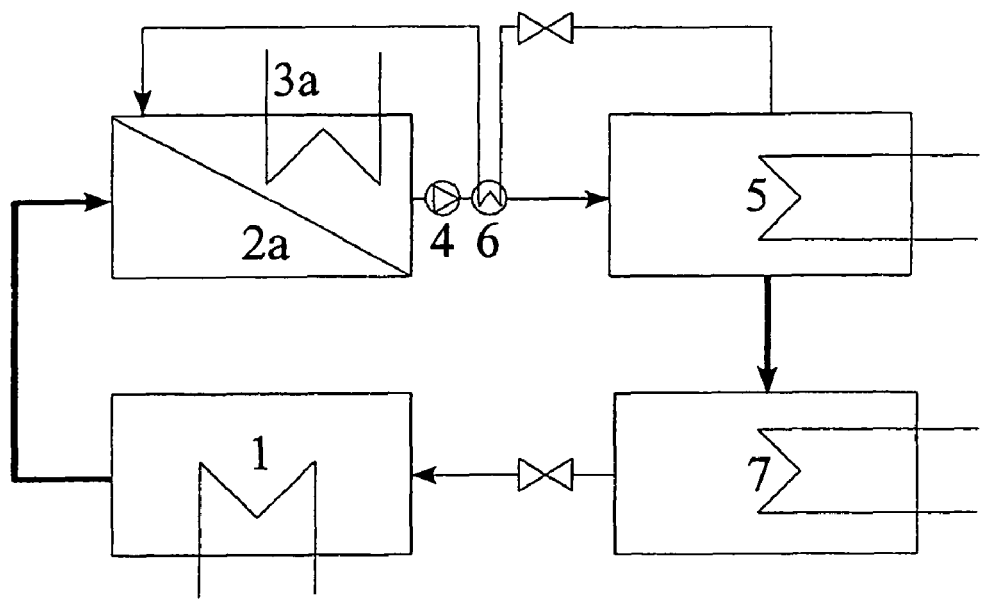
FIG. 1 shows a schematic representation of a refrigeration device—in accordance with the invention—with a membrane absorber with integrated cooling device.

FIG. 1 shows a schematic representation of a refrigeration device—in accordance with the invention—with cooled membrane absorber. In a conventional evaporator 1, the cooling agent evaporates with heat absorption. The vapor flows into a membrane device 2a, in which, after transit through the membrane, it will be absorbed by a solvent. By virtue of the better mass transfer pore-membranes are used preferentially in the membrane absorber 2a.

For cooling of the solution agent the membrane absorber contains additionally a heat exchanger 3a, with a cooling medium flowing inside. The rich solution is pumped by a solution pump 4 to a conventional desorber 5, in which the cooling agent vaporises by heat addition. The solvent is transported back to the absorber. In order to improve the energetic efficiency, a heat exchanger 6 can be integrated into the process. The cooling agent vapor exhausted in the desorber 5 is condensed in a conventional condenser 7 and the formed liquid is transported back after choking into the evaporator.

Figure 2:
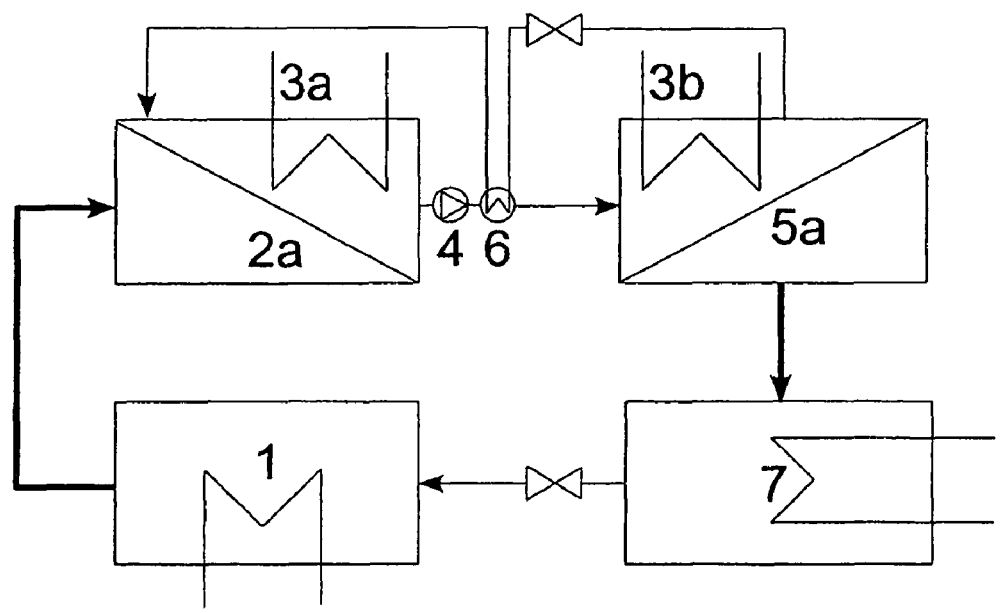
FIG. 2 shows—as a further embodiment of the present invention—a schematic representation of a refrigeration device with cooled membrane absorber and heated membrane desorber.

FIG. 2 shows—as a further embodiment of the present invention—a schematic representation of a refrigeration device with refrigerated membrane absorber and heated membrane desorber. Instead of the conventional desorber 5 of FIG. 1 a membrane device 5a is used for the desorption. The membrane device contains additionally one heat exchanger 3b in which a heating medium flows for to heat the solvent. In case of a volatile solvent membranes can be chosen which guarantee a selective mass transfer only for the cooling agent, in order to avoid a following rectification.

Figure 3:
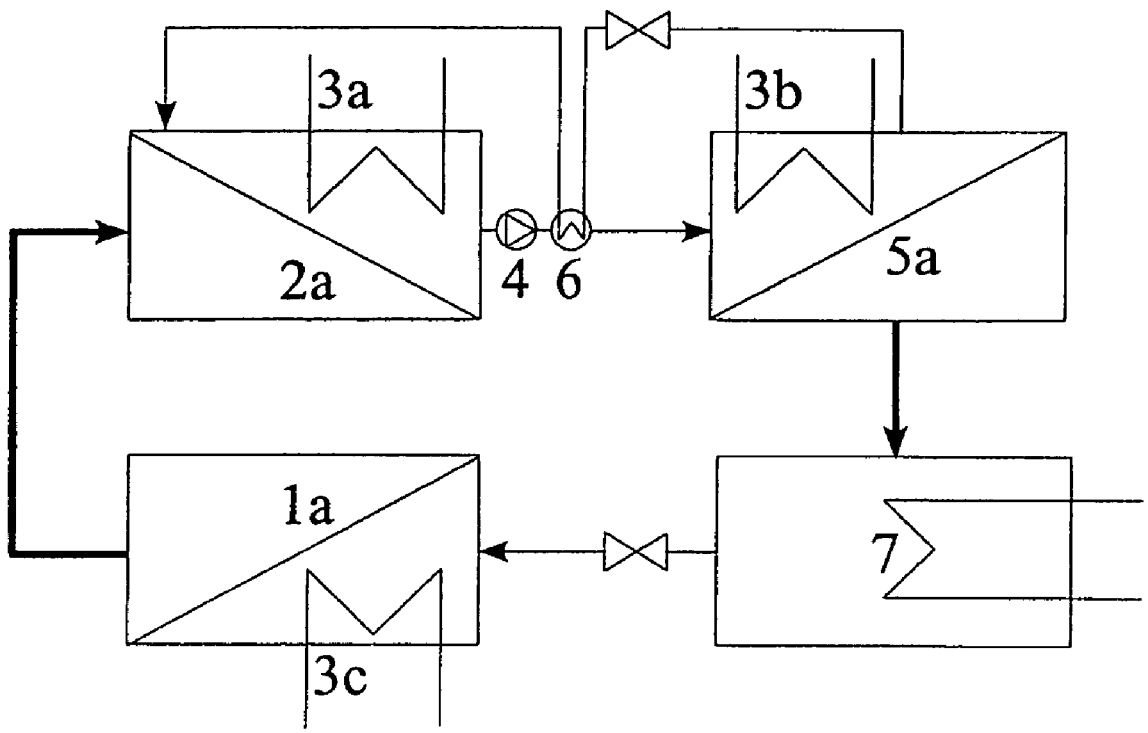
FIG. 3 shows—as a further embodiment of the present invention—a schematic representation of a refrigeration device with cooled membrane absorber, heated membrane evaporator and heated membrane desorber.

FIG. 3 shows—as a further embodiment of the present invention—a schematic representation of a refrigeration device with heated membrane absorber, heated membrane evaporator and heated membrane desorber. Instead of the conventional evaporator of FIGS. 1 and 2, here, for the evaporation, a membrane device 1a is used. The membrane device contains additionally one heat exchanger 3c with a heating medium flowing inside to heat the cooling agent.

Figure 4:
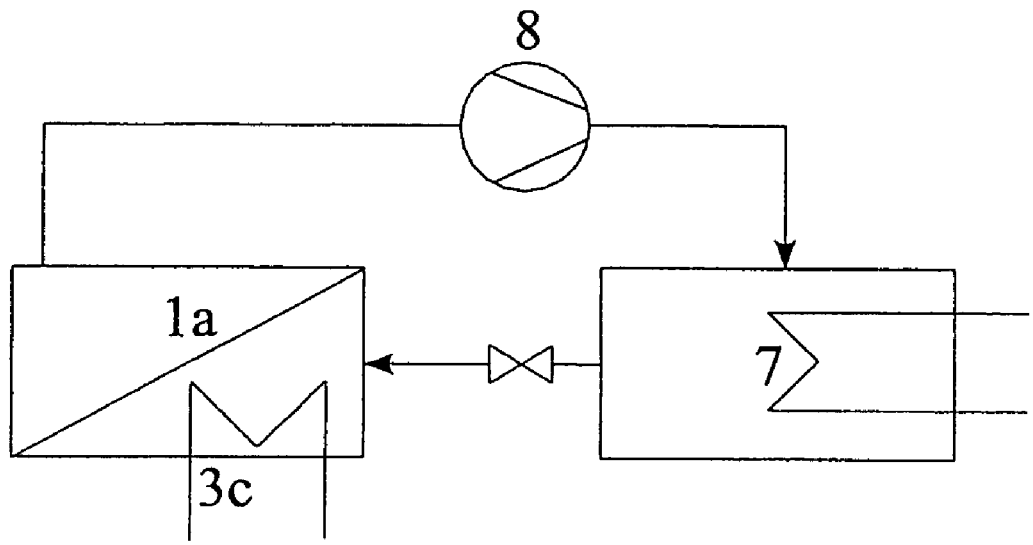
FIG. 4 shows—as a further embodiment of the present invention—a schematic representation of a refrigeration device with mechanical compressor 8, a membrane evaporator 1a and a condenser 7.

FIG. 4 shows—as a further embodiment of the present invention—a schematic representation of a refrigeration device with mechanical compressor 8, a membrane evaporator 1a and a condenser 7. The membrane evaporator contains additionally a heat exchanger 3c, with a heating agent inside, in order to heat the cooling agent. Here, the membrane device has the particular advantage to avoid damages to the compressor by liquid drops.

Therefore, according to the specific needs, it is possible to use appropriate processes for the refrigeration, by using membrane devices with integrated heat exchanger as well in absorption refrigerators with thermal compressor or in compression cycles with mechanical compressor. According to the boundary conditions the conventional components evaporator, condenser, absorber, desorber can be replaced by a membrane device. Particular advantage is given here by the integration of a heat exchanger into the membrane device. Nevertheless, a separate configuration of heat exchanger and membrane device is also possible.

Figure 5:
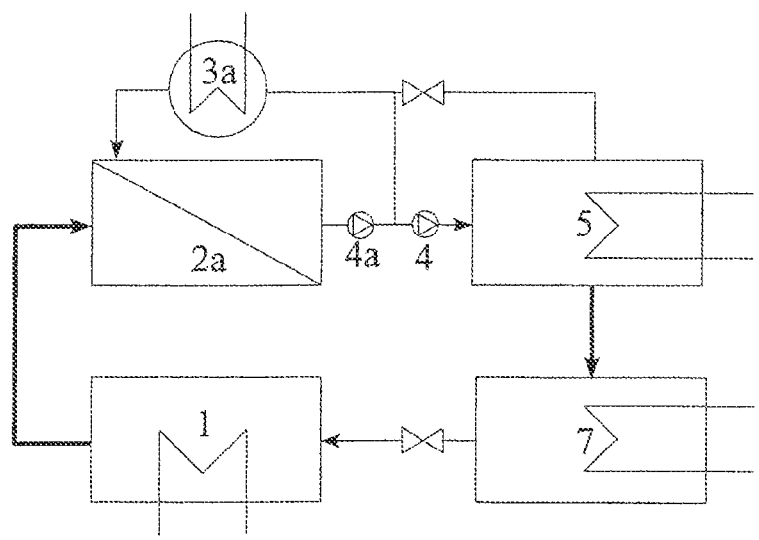
FIG. 5 shows—as a further embodiment—a refrigeration device with membrane components and external heat exchanger.

FIG. 5 shows—as a further embodiment—a refrigeration device with membrane components and external heat exchanger. The solvent throughput in the membrane absorber 2a is here drastically increased and only a small quantity of the out-coming solvent is let into the desorber 5 by the solution pump 4. Most of it is transferred back into the membrane device by means of an additional pump 4a where the solvent is cooled by the heat exchanger 3a before entering the membrane device. Analogously, the combination of membrane device and external heat exchanger can be used to heat or cool also the components desorber, evaporator and condenser.

Especially advantageous cooling agents for the process are ammonia and carbon dioxide. As solvents water or for carbon dioxide commercial absorption agents can be advantageously used, for example water containing amino solutions.

All shown devices in FIGS. 1 to 5 can also operate as heat pumps. The heat supply or release can also take place in more than two devices and on more than two temperature levels. Two or more cycles can be coupled with one other, according to FIGS. 1 to 5, by means of heat exchange.

A simple embodiment is an absorption refrigerator with membrane absorber according to FIG. 1, with the substances ammonia and water.

In the mobile air-conditioning, cooling demand at peak load of up to 7 kW is required. Pure ammonia ($\dot{m}_{NH3}$=5.4 g/s) evaporates in evaporator 1 at a temperature of $\Theta$=−5° C. and at a pressure of p=3.5 bar, on heat absorption from the environment to be cooled ($\Theta_{min}$=2° C.) flowing into the membrane absorber 2. In the membrane absorber ($\Theta_A$=45° C.), gas and fluid phases are separated by membranes which, however, are permeable for ammonia vapor.

During the absorption of the ammonia vapor through the membranes into the solvent (ammonia/water mixture, entrance $\dot{m}_{WL}^{arm}$=21.4 g/s, $x_{NH\,3}^{arm}$=0.13 g/g, $\Theta$=40° C.), a simultaneous cooling of this washing solution takes place with heat exchanger 3a. Through heat exchanger 3a cooling water with an entrance temperature of $\Theta$=40° C. is flowing and heated during the absorption. The solvent is enriched with ammonia ($\dot{m}_{WL}^{reich}$=26.8 g/s, $x_{NH\,3}^{reich}$=0.31 g/g) and transported by pump 4 to desorber 5, with a pressure of p=26 bar. To improve the energetic efficiency a solution heat exchanger 6 may be installed in front of desorber 5, in which the lean solvent flowing back is cooled and the rich solvent flowing from membrane absorber 2 to desorber 5 is preheated. In desorber 5, by means of heat supply with a further heat exchanger at a temperature of at least $\Theta_D$=190° C., ammonia evaporates ($\dot{m}_{NH3}$=5.4 g/s). The ammonia vapor is condensed in condenser 7 at p=26 bar (balance temperature $\theta$=60° C.), with heat release to the environment ($\Theta$=40° C.). In order to obtain pure ammonia vapor, a small distillation column, not shown in FIG. 1, is installed between desorber 5 and condenser 7. The liquid ammonia formed in condenser 7 is transferred back into the evaporator.

Assuming pore membranes for this embodiment, the membrane surface area is about 2 m$^2$, as a membrane device allows specific cooling rates of above 3 kW/m$^2$. For modern membrane modules, specific surface areas far above 500 m$^2$/m$^3$ are obtained, so that the resulting absorber volume is only 4 liters and therefore these membrane absorbers can be used advantageously in mobile applications for air-conditioning. Conventional falling film absorbers have a volume specific surface area of about 25 m$^2$/m$^3$ with heat transfer rates of about 500 W/m$^2$. For 7 kw cooling performance, the conventional fall film absorber requires a volume of about 500 l.

Appropriate membrane devices for the realisation of membrane components are described for example in WO 96/17674 A1 and EP 0 118 760 B1.

Appropriate membranes are especially solution diffusion membranes and microporous (hydrophobic and hydrophilic) membranes. The first ones have low mass transfer rates and must therefore be very thin. Therefore, a sufficient mechanical stability is only guaranteed using proper support material. Both membrane types exist as flat membranes for modules up to 1.000 m$^2$/m$^3$ and as hollow fiber membranes for modules of up to 10.000 m$^2$/m$^3$. The relevant pore sizes for the invention are preferentially located in the nanometre zone, i.e. between 5 and 1.000 nm. As membrane material for the pore membranes, among others, polypropylene, polysulfone, PTFE, PVDF, polyester, inorganic materials (ceramics, metals) etc. are appropriate, as pure substances or in mixtures.

Figure 6:
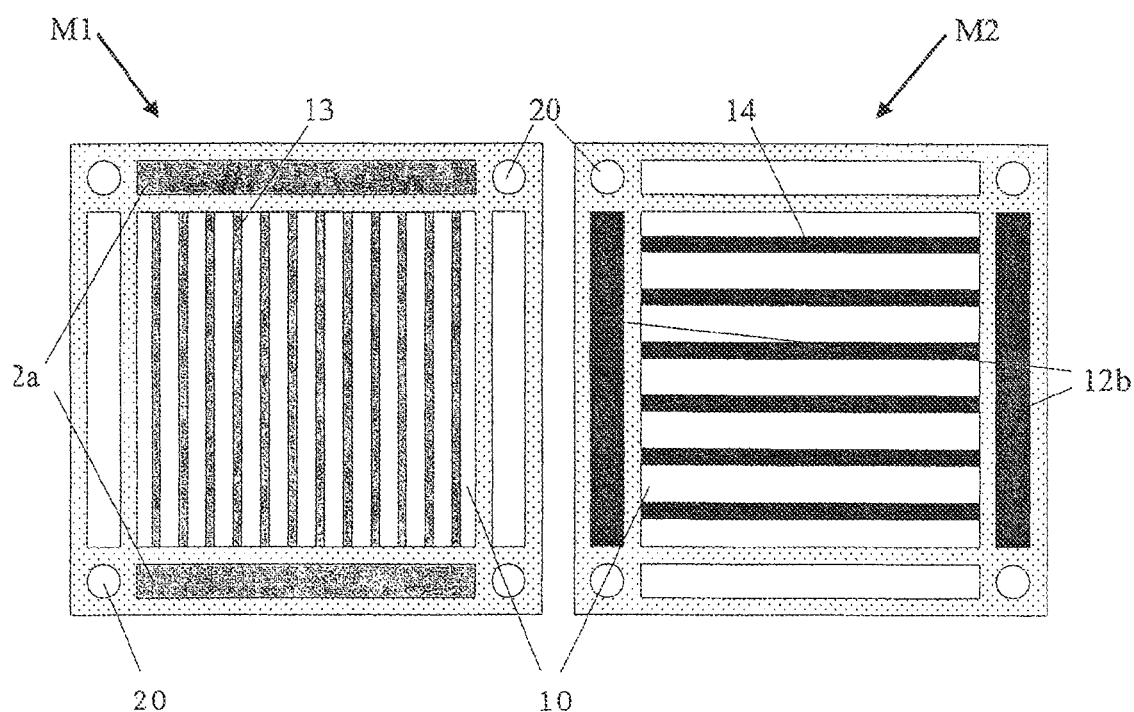
FIG. 6 shows a further embodiment of the invention with modular construction.

A further realisation with modular construction is shown in FIG. 6. FIG. 6 shows a plan of two basic modules made of plastic (modules M1 and M2) with channels and installed hollow fiber membranes/tubes.

On the left side of the illustration of FIG. 6 a first module M1 is shown, provided with hollow fiber membranes 13 (flow of the gas in image plane) the parts where ammonia is flowing are marked in grey. A second module M2 shown on the right side of FIG. 6 which is provided with cooling tubes 14 (flow of the cooling agent in image plane of FIG. 6). The solvent flows vertically to the image plane through a central channel 10, the parts containing solvent are marked in black. The gas is flowing vertically to the image plane in input or output channels 12a, the cooling medium is flowing vertically to the image plan by means of cooling medium channels 12b. Both shown modules M1, M2 can be composed to so called stacks, in any sequence. Therefore, at the corners of both modules M1, M2 boreholes 20 are provided for the reception (not shown) of plug pins. Additionally (not shown in detail) seals between the different modules are provided, where, according to what is needed, an input or output channel 12a, 12b is blocked by the seal, in order to guide the fluid through the membranes and cooling tubes.

Figure 7:
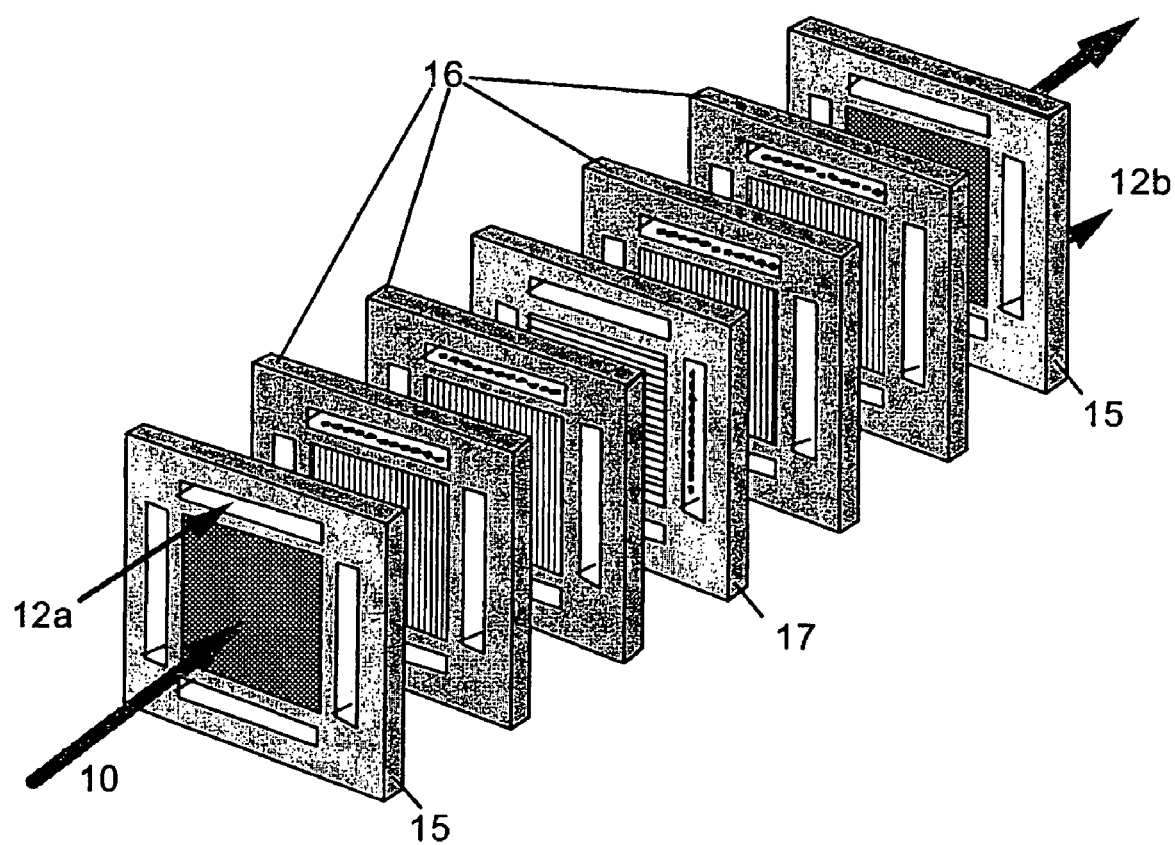
FIG. 7 shows a exploded view of a modular construction of a membrane absorber/desorber.

FIG. 7 shows an exploded view of a possible composition of an absorption/desorption module related to the invention. It contains four membrane units 16 and a heat exchange unit 17. The front and back end of each stack is realised by means of an end plate 15. Here, the solvent flows through the central channel 10, the gas (ammonia) through the in- and output channels 12a (to be found at top and bottom in FIG. 7) and the cooling medium flows through the cooling medium channels 12b (on the left and the right side in the representation of FIG. 7).

Thus, the invention provides a cheap, compact, mechanical shocks resistant thermodynamic machine, which has a high specific interphase area or membrane surface density and high membrane permeability.

What is claimed is:

1. A thermodynamic machine for absorption and emission of heat at different temperatures, the thermodynamic machine comprising:
   at least one thermodynamic device comprising at least one membrane separating a gas phase and a liquid phase provided for transport of heat, respectively, wherein the at least one membrane is permeable for at least one component contained in the gas and liquid phases and wherein the gas phase and the liquid phase are circulated in a common closed circuit and are separated by the at least one membrane;
   wherein the at least one membrane is a porous membrane or a solution diffusion membrane;

wherein the at least one thermodynamic device has a heat exchanger for supplying heat to or removing heat from one of the gas and liquid phases and wherein the heat exchanger is arranged inside the at least one thermodynamic device;

wherein the at least one membrane is comprised of hollow fiber membranes combined to bundles or stacks in order to generate high surface density, wherein spaces between the hollow fiber membranes in the bundles or stacks are sealed relative to each other.

2. The thermodynamic machine according to claim 1, wherein the at least one membrane is comprised of hollow fiber membranes or flat membranes combined to bundles or stacks in order to generate high surface density.

3. The thermodynamic machine according to claim 1, wherein the at least one thermodynamic device is selected from the group consisting of an evaporator, a condenser, an absorber, an adsorber, and a desorber.

4. The thermodynamic machine according to claim 1, wherein the gas phase is ammonia used as a cooling agent and the liquid phase is water or a water containing mixture used as a solvent, respectively.

5. The thermodynamic machine according to claim 1, wherein the gas phase is carbon dioxide used as a cooling agent and the liquid phase is an aqueous amine solution used as a solvent.

6. A thermodynamic machine for absorption and emission of heat at different temperatures, the thermodynamic machine comprising:

at least one thermodynamic device comprising at least one membrane separating a gas phase and a liquid phase provided for transport of heat, respectively, wherein the at least one membrane is permeable for at least one component contained in the gas and liquid phases and wherein the gas phase and the liquid phase are circulated in a common closed circuit and are separated by the at least one membrane;

wherein the at least one membrane is a porous membrane or a solution diffusion membrane;

at least one mechanical compressor.

7. The thermodynamic machine according to claim 6, wherein the at least one thermodynamic device has a heat exchanger for supplying heat to or removing heat from one of the gas and liquid phases.

8. The thermodynamic machine according to claim 7, wherein the heat exchanger is arranged inside the at least one thermodynamic device.

9. The thermodynamic machine according to claim 8, wherein the at least one membrane is comprised of hollow fiber membranes combined to bundles or stacks in order to generate high surface density, wherein spaces between the hollow fiber membranes in the bundles or stacks are sealed relative to each other and cooling tubes are arranged in the spaces.

10. The thermodynamic machine according to claim 7, wherein the heat exchanger is located outside the at least one thermodynamic device.

11. A method for absorption and discharge of heat at different temperatures, comprising the step of:

separating a gas phase and a liquid phase that are circulating in a common closed circuit and provided for transport of heat respectively, by at least one membrane that is permeable for at least one component contained in the gas and liquid phases, wherein the at least one membrane is a porous membrane or a solution diffusion membrane, wherein the method is embodied as a cold production process, a heat transformation process, a cold compression process, a compression heat pump process, an absorption refrigeration process, an absorption heat transformation process, or an absorption heat pump process.

12. The method according to claim 11, wherein at least the liquid phase is at a maintained temperature.

13. The method according to claim 11, wherein the at least one component contained in the gas and liquid phases passes through the at least one membrane.

14. The method according to claim 13, wherein the at least one component contained in the gas and liquid phases undergoes at least one of absorption, desorption, evaporation, and condensation in at least one thermodynamic device.

15. The method according to claim 13, wherein a temperature of one of the gas and liquid phases is increased and a temperature of the other of the gas and liquid phases is decreased.

* * * * *